Oct. 1, 1963    J. C. LITTLE    3,105,866
CONDUCTOR VIBRATION DAMPENER
Filed June 27, 1960    2 Sheets-Sheet 2

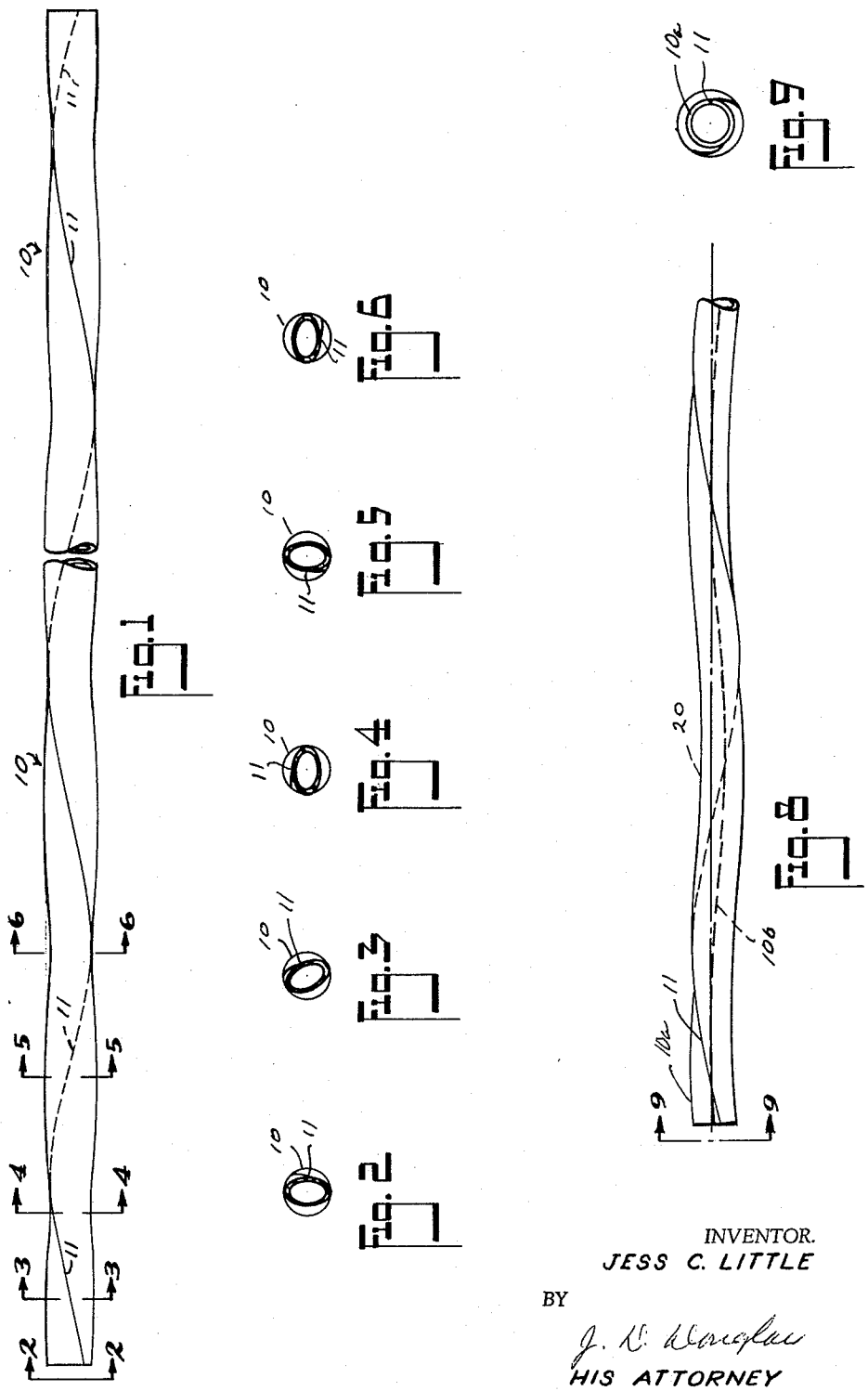

INVENTOR.
JESS C. LITTLE
BY
J. S. Douglas
HIS ATTORNEY

United States Patent Office

3,105,866
Patented Oct. 1, 1963

3,105,866
CONDUCTOR VIBRATION DAMPENER
Jess C. Little, Cleveland Heights, Ohio, assignor to The Fanner Manufacturing Company, a Division of Textron, Inc., Cleveland, Ohio, a corporation of Rhode Island
Filed June 27, 1960, Ser. No. 39,134
3 Claims. (Cl. 174—42)

This invention relates to improvements in vibration dampening devices and more particularly to devices for dampening vibrations in electrical power, communication, transmission lines or the like which are for the transmission of power, communication and for other purposes.

As is well known to those versed in the art, electrical lines, such as telephone lines, transmission lines etc., which are stretched between poles, frequently have a vibration induced therein which is usually caused by the wind blowing on the line; this causes the line to have nodes and antinodes of vibration, the length of which is determined by the diameter, mass and tension of the line and wind velocity. These vibrations cause the line to be repeatedly bent, particularly at the insulator, which bending ultimately causes crystallization of the metal and breaking.

Numerous means have been proposed to suppress or reduce these vibrations. Many of the prior devices had to be secured to the line at a fixed point and as a result caused failure at the point where they were secured. Nearly all of the prior devices added weight to the line. In many instances the vibration could not be entirely suppressed because the dampener could not be readily positioned at the line in the most effective place to suppress the vibrations.

Nearly all of the prior devices are relatively expensive.

Among the previously used dampeners were those that included a straight tube of plastic material having an internal diameter considerably larger than the line and which tube was placed on the line, usually close to the point of attachment of the line to the insulator at the pole. The present invention is particularly concerned with this type of dampener. Usually these dampeners have been straight tubes of plastic material such as polyethylene, which have been split throughout their length, preferably with a spiral split, so that the split may be opened up and the dampener applied to the line from the side.

The previous dampeners, being cylindrical throughout their length, provided substantially a line contact with the line.

The present invention contemplates a dampener also made in tubular form, except that it does not have a line contact with the line but has spaced contacts therewith. Furthermore the spaced contacts are so arranged that they are of a shifting nature, that is if the dampener revolves, the point of contact shifts with the dampener, with the result that forces are applied to the line at different points at different times. Furthermore the point contacts provide a further operational advantage in that the flexure of the dampener within itself is greater than in previous dampeners. The combination of the point contacts and their shifting nature also is believed to be the cause of an erratic type of rotation of the dampener about the line and prevention of any in phase vibrations of the dampener with the line.

Still other advantages of the invention, and the invention itself, will become more apparent from the following description of some embodiments thereof, which are illustrated by the accompanying drawings and form a part of this specification.

In the drawings:

FIG. 1 is a full sized view in side elevation with a section broken away illustrating a dampener of my invention;

FIGS. 2, 3, 4, 5 and 6 are elevational and sectional views from the lines 2—2, 3—3, 4—4, 5—5 and 6—6, respectively, of the dampener of FIG. 1;

FIG. 8 is a fragmentary side elevational view of a modified form of the invention;

FIG. 9 is a view from the line 9—9 of FIG. 8; and

Referring to the drawings, throughout which like parts are designated by like reference characters.

As best shown in FIG. 1, the dampener comprises a tubular member 10, which is provided with a helical split 11 throughout its length. The tube is preferably made of a plastic material, of which polyethylene is particularly suitable. It should be understood, however, that other materials, and, in some instances even metal, might be used. Flexibility however is desirable and the flexibility should be such that the split portion may be opened up and the dampener applied to the line from the side. A tube without a split could be used but is impractical from the installation standpoint, except on relatively short lines. At the same time there should be a sufficient amount of rigidity that the dampener will retain its form on the line. It should be noted that although the split is shown opposite to the minor axis it can be any place including on the major axis.

Of particular importance is the fact that the dampener of the invention is not a straight cylinder throughout its length but that it be provided with portions which engage with the line at spaced intervals. This objective may be accomplished in several ways.

As best shown in FIGS. 1 to 6 inclusive, one manner of effecting this is by shaping the internal bore of the dampener in the form of an ellipse or oval, the major and minor axes of which twist or revolve from one end of the dampener to the other. It is preferred that the twist of the ellipse follow the spiral slit, since this provides several advantages both from the manufacturing and installation standpoint. It should be pointed out, however, that in this embodiment the split could be straight, rather than helical; it could be a helix of opposite pitch to that of the twist of the ellipse.

As best seen from the end view of FIG. 2, the dampener is elliptical or oval in cross section and the split 11 occurs at the mid-section or opposite the narrowest diameter of the oval. FIG. 3 shows that the ellipse has twisted 45° and the slit 11 has followed the twist, the twisting being in a counterclockwise direction, as viewed from the line 2—2. FIGS. 4, 5 and 6 show sections taken at 90°, 180° and 270°, respectively. It should be pointed out that the twist may be either clockwise, as shown, or counterclockwise.

It should be pointed out that a true ellipse is not essential to the operation and that oblate forms could be used and that in some instances triangular, rectangular or polygonal cross section would be effective. It is also contemplated that the desired effect may be obtained by making the tube cylindrical and forming a helical land on the interior of the tube. The land could be a continuous land or made up of a series of projections. This land could also be provided by taking straight tubes and passing them through a heated die to cause the material to be deformed inward.

Figure 7:
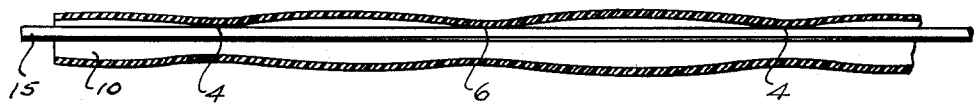
FIG. 7 is a fragmentary sectional view illustrating the dampener in position on a line.

The result of the configuration is illustrated in FIG. 7. Here the dampener illustrated is applied to a line 15. It will be noted that the dampener rests on the lines at the points 4, 6 and 4, which are the points corresponding to the sections 4—4 and 6—6 of FIG. 1. The engagement of the dampener with the line is peculiar in that should the tube start to revolve, as it sometimes does, due to vibration, the points of contact of the damper with the line will move longitudinally of the device in one direction or the other, depending upon the direction of revolution.

In FIG. 8, I have shown another modification wherein the tube 10a has a cross sectional formation that is circular and the center of the circle, progressively from end to end, follows a helix. In this drawing the tube in general is indicated at 10a and the diametrical center 10b of the tube partakes of a helix throughout its length. It will be noted that the tube will engage with the wire at the points 20 which correspond to the points 6 of FIG. 7. The action is the same as described.

Figure 10:
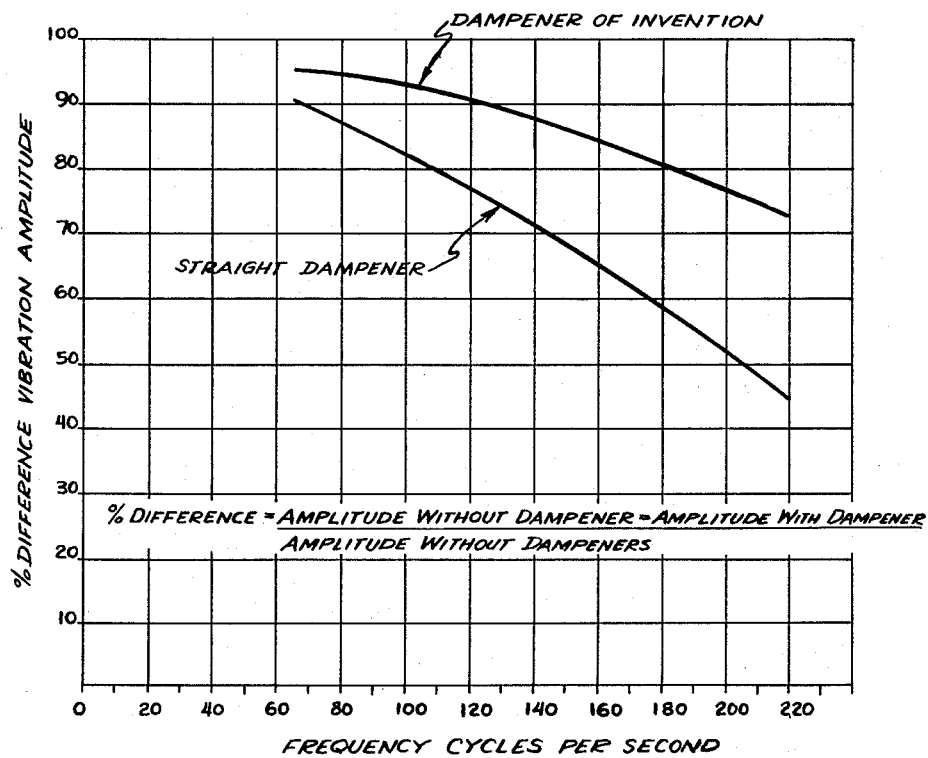
FIG. 10 is a chart showing the results obtained when applying the dampener to a telephone line wire.

FIG. 10 is a chart, made from actual measurements in a vibrating testing laboratory where a steel telephone wire of .109' diameter and a 48 foot span was tensioned at 600 pounds and vibrations were applied to the wire at the center of the span. The chart shows the results in the lower curve of a conventional dampener comprised of a straight cylindrical tube, and, in the upper curve, a dampener constructed according to my invention. In each instance dampeners were applied at each end of the strand at the first free loop adjacent the point of end connection. The conductor was maintained in vibration by a magnetic vibrator motor. Frequency controlled conductor amplitudes were recorded on a galvanometer type oscillograph. Amplitude data was plotted on the chart, being values at the center of the loop. The chart is a quantative analysis relating a percentage difference in amplitudes of the line before and after installation of the dampeners. The efficiency indicator was as shown on the drawings.

It will be noted that as the frequency was changed from 65 cycles to 210 cycles per second, both dampeners were effective to decrease the vibration amplitude, but the vibration dampener of the invention had a range of 95% at 65 cycles to 75% at 200 cycles, while the prior art dampener started at 87% and decreased to 47%.

I have found that a very useful length for the dampeners is 18 inches. It is apparent, however, that the length may be varied greatly depending on the particular application. The amount of deformation of the body of the dampener, i.e. amplitude of helical formation, is such that the line fits loosely within the dampener. I have found that the amount of deformation may vary within wide limits. A general rule may be stated, however, in that the amount of deformation may be such that at the point of its spaced engagement with the wire the nearest point of the dampener, diametrically opposite to the point of the engagement, is spaced a distance substantially equal to or greater than the diameter of the wire. Thus the dampener may be moved bodily at any time a distance transverse to the wire that is equal to the diameter of the wire. It is also within the concept of the invention that the helical deformation and internal diameter of the dampener, relative to the diameter of the wire to which it is applied, be such that the high and low points of deformation may contact with the line at spaced intervals on spaced opposite sides.

The exact reason for the improved operation of my new dampener is at present not thoroughly understood. It is believed, however, that the improved results are due to the spacing of the contact points and the increasing number of contacts as compared to the conventional cylindrical dampeners.

Other things apparently enter into and result in an improved operation. Due to the spaced points of suspension of the dampener a certain amount of flexure is obtained which cannot be seen in ordinary dampeners.

There is also spinning of the dampener on the line but it is of an irregular nature.

One of the observed effects is the ability of the dampener to travel along the line and seek out the point of greatest vibration where it suppresses that vibration. The results as shown by the graph indicate a marked improvement over the prior art.

Due to its being made in short sections, it is easier to put on the line. Due to its light weight, it does not materially weight the line. Due to the points of spaced contact, there is no concentration of contact at one point, causing abrasion of the line or vibration fatigue damage.

Having thus described the invention in some embodiments thereof, I am aware that numerous and extensive departures from the structures illustrated and described may be made without departing from the concepts of the invention as defined in the appended claims.

I claim:

1. In combination with a line suspended between a pair of supports, means to dampen the vibrations of said line consisting of a tube of materially shorter length than the line and having an inner diameter greater than the diameter of the line at all points around the inside of the tube from one end to the other, disposed around and loosely supported by the line whereby the tube may be free to rotate, said tube being formed to provide portions which engage with the line on one side at spaced intervals through the length of the tube, said portions extending throughout the length of the tube and extending helically around the inside of the tube which, upon rotation of the tube around the line, cause the points of contact of the tube with the line to move along the line.

2. A device as described in claim 1, wherein said tube is formed of flexible material and is of oval cross section throughout its length and is split longitudinally and helically to enable it to be applied to the line from its side.

3. A device as described in claim 2, wherein said tube is formed of a flexible material of circular cross section and is in the form of a helix, said tube being split longitudinally and helically to enable it to be applied to the line from its side.

References Cited in the file of this patent

UNITED STATES PATENTS

| | | |
|---|---|---|
| 563,273 | Guilleaume | July 7, 1896 |
| 2,225,334 | Daniels | Dec. 17, 1940 |
| 2,275,019 | Peterson | Mar. 3, 1942 |
| 2,648,720 | Alexander | Aug. 11, 1953 |
| 2,969,416 | McGavern | Jan. 24, 1961 |

FOREIGN PATENTS

| | | |
|---|---|---|
| 644,628 | Germany | May 10, 1937 |
| 116,651 | Austria | Mar. 10, 1930 |